US008194265B2

(12) United States Patent
Jung et al.

(10) Patent No.: US 8,194,265 B2
(45) Date of Patent: Jun. 5, 2012

(54) METHOD OF AUTHENTICATING CONTENT PROVIDED TO IMAGE FORMING APPARATUS AND IMAGE FORMING APPARATUS TO PERFORM THE METHOD

(75) Inventors: Jung-woon Jung, Suwon-si (KR); Jin-young Lee, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 677 days.

(21) Appl. No.: 12/273,621

(22) Filed: Nov. 19, 2008

(65) Prior Publication Data

US 2009/0268223 A1 Oct. 29, 2009

(30) Foreign Application Priority Data

Apr. 23, 2008 (KR) ........................ 10-2008-0037835

(51) Int. Cl.
*G06K 15/00* (2006.01)

(52) U.S. Cl. ...... 358/1.14; 358/1.9; 358/1.13; 358/1.15; 358/1.18; 399/8; 399/10; 399/12; 399/75; 399/77; 711/5; 711/103; 711/170

(58) Field of Classification Search ........................ None
See application file for complete search history.

(56) References Cited

U.S. PATENT DOCUMENTS 6,158,837 A * 12/2000 Hilton et al. .................... 347/19
6,512,894 B2 * 1/2003 Takemoto et al. .............. 399/12
6,748,182 B2 * 6/2004 Yoshida et al. ................. 399/12
6,978,255 B1 * 12/2005 Pauschinger et al. ........... 705/61
7,043,166 B2 * 5/2006 Parry et al. ...................... 399/12
7,221,878 B2 * 5/2007 Chen ................................ 399/12
7,359,072 B2 * 4/2008 Isozaki et al. ................ 358/1.14
7,369,784 B2 * 5/2008 Ishihara et al. ................. 399/12
7,433,065 B2 * 10/2008 Phillips et al. ............... 358/1.14
7,437,311 B2 * 10/2008 Phillips ........................ 705/26.8
7,460,262 B2 * 12/2008 Simpson ...................... 358/1.15
2003/0031475 A1 * 2/2003 Asakura .......................... 399/12
2003/0036951 A1 * 2/2003 Phillips et al. .................. 705/14
2004/0066435 A1 * 4/2004 Lester et al. ..................... 347/86
2004/0246517 A1 * 12/2004 Parry ........................... 358/1.15
2005/0018233 A1 * 1/2005 Parry et al. ................... 358/1.14
2005/0285899 A1 * 12/2005 Simpson et al. ................ 347/49
2006/0045595 A1 * 3/2006 Hanaoka ......................... 400/62
2006/0204250 A1 * 9/2006 Ishihara et al. ................. 399/12
2007/0073872 A1 * 3/2007 Wille ............................ 709/224
2008/0055648 A1 * 3/2008 Fukasawa .................... 358/1.18

FOREIGN PATENT DOCUMENTS

JP 2003006529 1/2003

* cited by examiner

*Primary Examiner* — King Poon
*Assistant Examiner* — Dung Tran
(74) *Attorney, Agent, or Firm* — Stanzione & Kim, LLP

(57) ABSTRACT

A method of authenticating at least one piece of content provided to an image forming apparatus in which at least one consumable is disposed includes determining whether the at least one consumable includes authentication information of the at least one piece of content, displaying the at least one piece of content on a user interface according to a license policy corresponding to the authentication information, selecting at least one piece of content from the at least one piece of content displayed on the user interface, and executing the selected at least one piece of content.

19 Claims, 4 Drawing Sheets

FIG. 2

250 260 270 200

Total License Count: 20 Used License Count: 15 Remain License Count: 5

| Index | Contents Name(210) | Provider (220) | License Count (230) | Status (240) |
|---|---|---|---|---|
| 1 | Scan To Mobile | Mobile Print co. | 3 | Licensed |
| 2 | Widget Platform | Widget Print co. | 5 | Licensed |
| 3 | Widget Clock | Mobile Print co. | 2 | Licensed |
| 4 | Widget Weather | Widget Print co. | 2 | Licensed |
| 5 | Widget News | Widget Print co. | 2 | Licensed |
| 6 | Fax To Email | Fax Ctx co. | 4 | Unlicensed |
| 7 | Receive Fax To PC | Fax Ctx co. | 6 | Unlicensed |

Run Get License Release License Delete Contents

FIG. 3

340 300

Licensable Provider: widget print co.

| Index | Contents Name(310) | Provider (320) | Status (330) |
|---|---|---|---|
| 1 | Scan To Mobile | Mobile Print co. | Licensed |
| 2 | Widget Platform | Widget Print co. | Licensed |
| 3 | Widget Clock | Mobile Print co. | Licensed |
| 4 | Widget Weather | Widget Print co. | Licensed |
| 5 | Widget News | Widget Print co. | Unlicensed |
| 6 | Fax To Email | Fax Ctx co. | Unlicensed |
| 7 | Receive Fax To PC | Fax Ctx co. | Unlicensed |

Run Get License Release License Delete Contents

FIG. 4

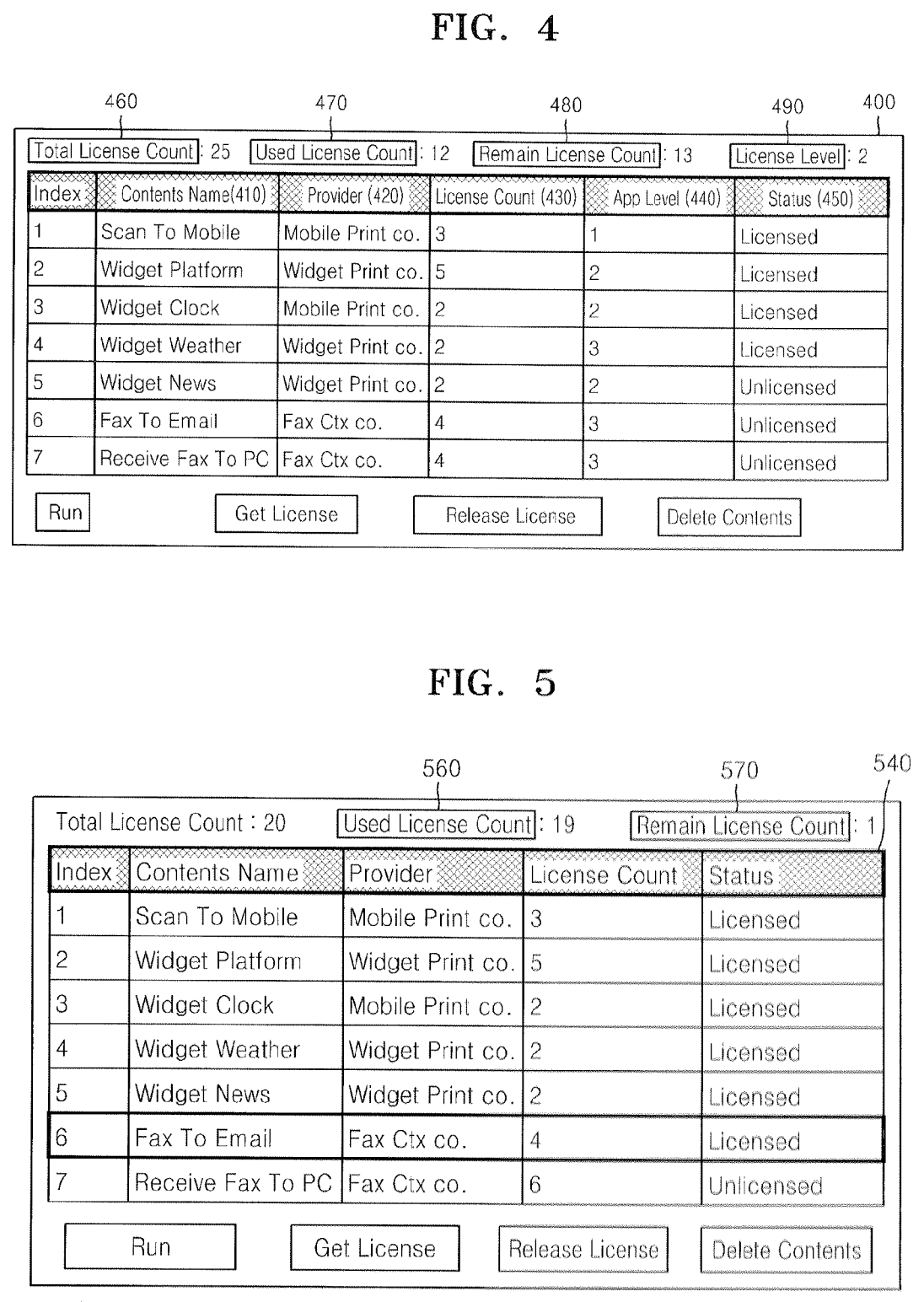

460 470 480 490 400

Total License Count : 25 Used License Count : 12 Remain License Count : 13 License Level : 2

| Index | Contents Name(410) | Provider (420) | License Count (430) | App Level (440) | Status (450) |
|---|---|---|---|---|---|
| 1 | Scan To Mobile | Mobile Print co. | 3 | 1 | Licensed |
| 2 | Widget Platform | Widget Print co. | 5 | 2 | Licensed |
| 3 | Widget Clock | Mobile Print co. | 2 | 2 | Licensed |
| 4 | Widget Weather | Widget Print co. | 2 | 3 | Licensed |
| 5 | Widget News | Widget Print co. | 2 | 2 | Unlicensed |
| 6 | Fax To Email | Fax Ctx co. | 4 | 3 | Unlicensed |
| 7 | Receive Fax To PC | Fax Ctx co. | 4 | 3 | Unlicensed |

Run Get License Release License Delete Contents

FIG. 5

560 570 540

Total License Count : 20 Used License Count : 19 Remain License Count : 1

| Index | Contents Name | Provider | License Count | Status |
|---|---|---|---|---|
| 1 | Scan To Mobile | Mobile Print co. | 3 | Licensed |
| 2 | Widget Platform | Widget Print co. | 5 | Licensed |
| 3 | Widget Clock | Mobile Print co. | 2 | Licensed |
| 4 | Widget Weather | Widget Print co. | 2 | Licensed |
| 5 | Widget News | Widget Print co. | 2 | Licensed |
| 6 | Fax To Email | Fax Ctx co. | 4 | Licensed |
| 7 | Receive Fax To PC | Fax Ctx co. | 6 | Unlicensed |

Run Get License Release License Delete Contents

METHOD OF AUTHENTICATING CONTENT PROVIDED TO IMAGE FORMING APPARATUS AND IMAGE FORMING APPARATUS TO PERFORM THE METHOD

CROSS-REFERENCE TO RELATED APPLICATIONS

This application claims priority under 35 U.S.C. §119(a) from Korean Patent Application No. 10-2008-0037835, filed on Apr. 23, 2008, in the Korean Intellectual Property Office, the disclosure of which is incorporated herein in its entirety by reference.

BACKGROUND OF THE INVENTION

1. Field of the Invention

The present general inventive concept relates to a method of authenticating content provided to an image forming apparatus and the image forming apparatus to perform the method, and more particularly to, a method of using content containing various functions in an authorized user's image forming apparatus, and the image forming apparatus to perform the method.

2. Description of the Related Art

In general, image forming apparatuses have at least one function of printing, copying, scanning, and faxing.

A recent development in technology provides image forming apparatuses with various functions so that a user can use the image forming apparatuses to perform printing, copying, scanning, and faxing functions, and perform various functions satisfying the user's requirements, such as transmitting scan data generated by performing the scanning operation via e-mail or fax.

Image forming apparatuses can perform various functions satisfying the user's requirements, in addition to basic functions of printing, copying, scanning, and faxing functions. Since users use image forming apparatuses for a variety of purposes, image forming apparatuses need to perform various functions according to the users' requirements. Thus, manufacturing image forming apparatuses capable of various functions satisfying users' requirements is very difficult and inefficient.

Conventional image forming apparatuses provide a basic environment in which a variety of functions required by users are extended and changed, receive content containing the functions required by users, and provide an environment in which the functions required by users can be performed by using a method of performing functions of the received content. In this regard, the content containing the functions required by users is produced by a content development company.

However, when users use conventional image forming apparatuses that receive content containing necessary functions and perform functions required by users, the received content can be easily copied without limitations and distributed to other image forming apparatuses and other users, so that the functions contained in the received content cannot be protected. In more detail, although content development companies are entitled to be reasonably compensated for the use of content by users that use the content, when unauthorized image forming apparatuses use the content, or an image forming apparatus that receives content having a limited period uses functions of the content without time restrictions, content development companies cannot be reasonably compensated.

Also, if an unauthorized content user uses functions contained in the content in another image forming apparatus without paying for the content, in comparison, an authorized content user that pays for the content suffers an economic loss. Thus, protecting the content is necessary so that the authorized content user that pays for the content can use the functions contained in the content.

SUMMARY OF THE INVENTION

The present general inventive concept provides a method of stably using content in an image forming apparatus having an authorized right to use the content.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a computer-readable recording medium having embodied thereon a program to execute a method, the method including determining whether the at least one consumable includes authentication information of the at least one piece of content, displaying the at least one piece of content on a user interface according to a license policy corresponding to the authentication information, selecting at least one piece of content from the at least one piece of content displayed on the user interface, and executing the selected at least one piece of content.

The foregoing and/or other aspects and utilities of the general inventive concept may also be achieved by providing a method of authenticating at least one piece of content provided to an image forming apparatus in which at least one consumable is disposed, the method including determining whether the at least one consumable includes authentication information of the at least one piece of content, displaying the at least one piece of content on a user interface according to a license policy corresponding to the authentication information, selecting at least one piece of content from the at least one piece of content displayed on the user interface, and executing the selected at least one piece of content.

The foregoing and/or other aspects and utilities of the general inventive concept may also be achieved by providing a computer-readable recording medium having embodied thereon a computer program to execute a method, the method including authenticating at least one piece of content provided to an image forming apparatus in which at least one consumable is disposed.

The foregoing and/or other aspects and utilities of the general inventive concept may also be achieved by providing an apparatus to authenticate at least one piece of content provided to an image forming apparatus in which at least one consumable is disposed, the apparatus including an information determining unit to determine whether the at least one consumable includes authentication information of the at least one piece of content, a display unit to display the at least one piece of content on a user interface according to a license policy corresponding to the authentication information, a selection input unit to select at least one piece of content from the at least one piece of content displayed on the user interface, and an executing unit to execute the selected at least one piece of content.

The foregoing and/or other aspects and utilities of the general inventive concept may also be achieved by providing consumable including a storage unit to store authentication information used to authenticate at least one piece of content.

The foregoing and/or other aspects and utilities of the general inventive concept may also be achieved by providing an authentication apparatus including a display unit to display content having authentication information according to a license policy corresponding to the authentication information, a selection input unit to select the displayed content, and an executing unit including an authentication processing unit to authenticate the selected content satisfying the license policy, and to execute the selected content and to change one or more parameters of the executed content according to the license policy.

The foregoing and/or other aspects and utilities of the general inventive concept may also be achieved by providing an authentication method including displaying content having authentication information according to a license policy corresponding to the authentication information, selecting the displayed content, authenticating the selected content satisfying the license policy, executing the selected content, and changing one or more parameters of the executed content according to the license policy.

BRIEF DESCRIPTION OF THE DRAWINGS

The above and other features and utilities of the present general inventive concept will become more apparent by describing in detail exemplary embodiments thereof with reference to the attached drawings in which:

FIG. 2 is a user interface illustrating a license policy that previously determines a license count necessary to authenticate each piece of content according to an embodiment of the present general inventive concept;

FIG. 3 is a user interface illustrating a license policy that uses content developed by a specific content provider according to an embodiment of the present general inventive concept;

FIG. 4 is a user interface illustrating a license policy that previously determines a license count and a license rank necessary to authenticate each piece of content according to an embodiment of the present general inventive concept;

FIG. 5 is a user interface illustrating when selected content satisfies a license policy that previously determines a license count necessary to authenticate each piece of content according to an embodiment of the present general inventive concept;

DETAILED DESCRIPTION OF THE PREFERRED EMBODIMENTS

Figure 1:
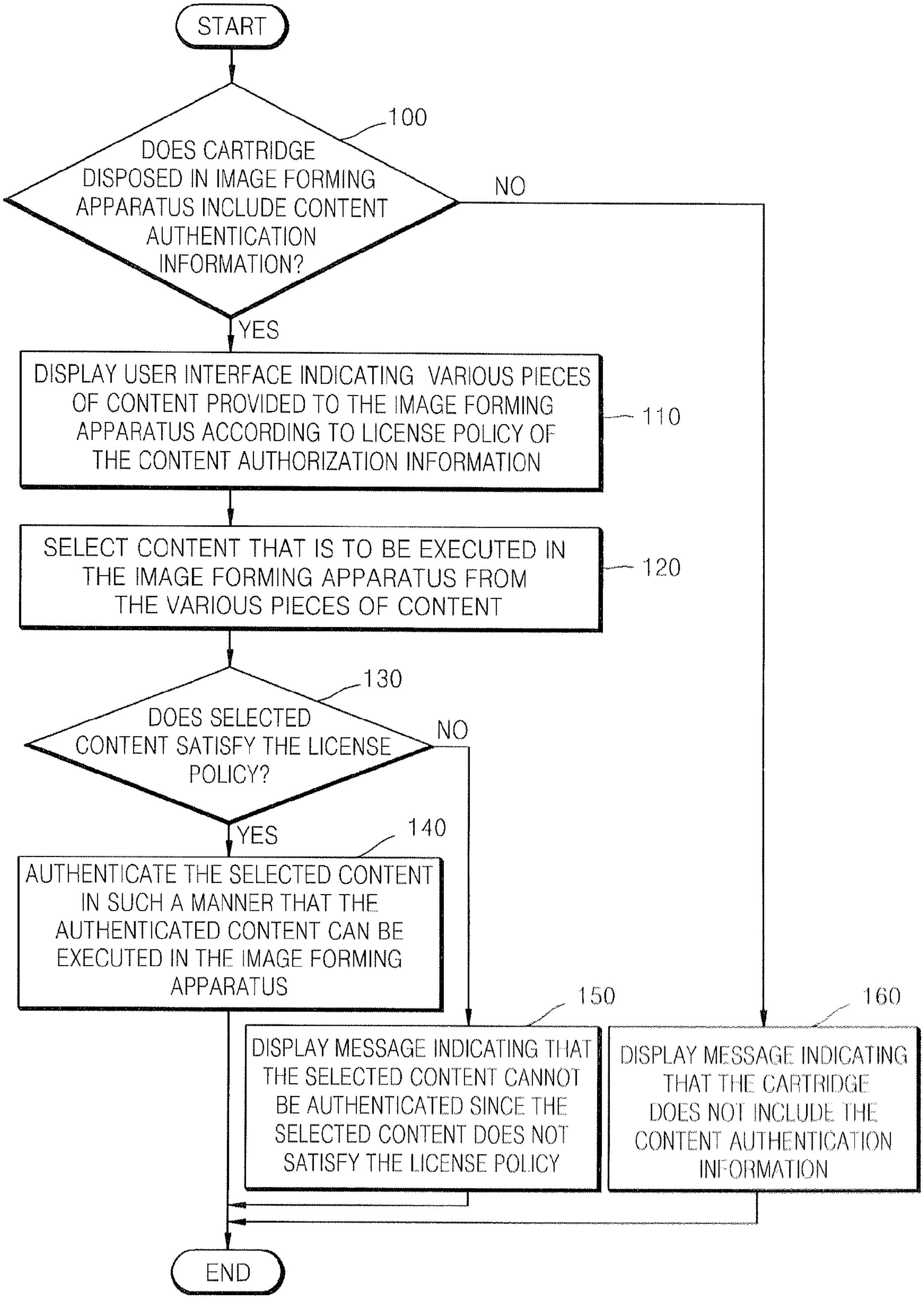
FIG. 1 is a flowchart illustrating a method of authenticating content available in an image forming apparatus according to an embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a flowchart illustrating a method of authenticating content available in an image forming apparatus according to an embodiment of the present general inventive concept. Referring to FIG. 1, in operation 100, a determination is made whether a cartridge disposed in the image forming apparatus includes content authentication information.

According to the method of authenticating content available in the image forming apparatus of the present embodiment, the image forming apparatus can have a license consumable or a general consumable. The consumable can be detached/attached from/to the image forming apparatus, and must be changed with a new consumable according to a defined consumable standard or when something is wrong with the consumable. An example of the consumable includes at least one of a developing unit including an Organic Photo Conductor (OPC) drum to form an image thereon, a toner cartridge to contain toner (developer) and to feed the toner (developer) to an image forming element, a feeding unit to feed a printing medium to an image forming unit to form an image on the printing medium, and a transfer belt to transfer an image from an image forming element to a printing medium.

In the present embodiment, the consumable is the toner cartridge. However, the present general inventive concept is not limited thereto. It is possible that the consumable is a unit to be replaced or changed according to a predetermined condition. The method of authenticating content available in the image forming apparatus of the present embodiment will now be described.

A general cartridge is used to perform a printing operation in an image forming apparatus. A license cartridge includes license information used to authenticate content. In more detail, the license cartridge of the present embodiment further includes content authentication information, in addition to basic information such as a page count, a model number, a security code, etc.

Examples of the content authentication information include a license code, a license policy, policy information, etc. The license code, which is an encrypted code, is cartridge information encrypted by using a key in a combination of the cartridge information. The image forming apparatus generates the key and decrypts the encrypted cartridge information.

The license policy is information regarding license applied rules in which various rules can be defined according to a content selling method, and describes a rule to limit access to the content available in the image forming apparatus.

The license policy of the present embodiment will now be described.

If the content selling method is based on a license count, a license policy to limit the license count can be used in various pieces of content contained in the image forming apparatus irrespective of a content developing company. The license policy enables the use of content that applies the license count among various pieces of content contained in the image forming apparatus.

When content is sold according to a business to business (B2B) agreement, a license policy of providing a license cartridge to use content developed by a specific content provider after contracting an agreement with the content provider can be used. In this case, a license policy of providing the license cartridge to use some pieces of designated content can be used.

Also, a license policy of classifying, by ranks, various pieces of content contained in the image forming apparatus or various pieces of content provided by a content providing server according to a functional importance, generating licenses according to the divided contents, and preventing high ranked content from being used with a low ranked license, can be used.

A license policy of determining whether a refill cartridge is allowed and designating allowance conditions can be used.

These license policies are not limited thereto but other license policies can be used. A combination of these license policies can be used so that a plurality of license policies can be included in a single license cartridge.

The policy information is secondary information regarding the license policy, which is necessary for the authorization of content, such as information about a content provider, a license level, etc. The policy information may not be necessary according to the license policy.

Referring to FIG. 1, in operation 100, determining whether the cartridge disposed in the image forming apparatus is possible includes the content authentication information by confirming if the cartridge includes the license code. If the cartridge disposed in the image forming apparatus includes the content authentication information, operation 110 is performed. If not, operation 160 is performed. In the present embodiment, a plurality of consumables can be disposed in the image forming apparatus.

In operation 110, a user interface indicating various pieces of content provided to the image forming apparatus is displayed on the image forming apparatus according to the license policy of the content authorization information included in the cartridge. Various pieces of content can display content information in consumables, or in some pieces of similar contents according to a content provider, content types, and a content function.

FIG. 2 is a user interface 200 illustrating a license policy that previously determines a a license count necessary to authenticate each piece of content according to an embodiment of the present general inventive concept. Referring to FIG. 2, the user interface 200 can indicate a content name 210, a content provider 220, the license count necessary to authenticate each piece of content 230 (License Count 230), and status 240. The user interface 200 can further indicate total license count (250), used license count (260), and remain license count (270). Items indicated in the user interface 200 are content parameters that vary according to the execution of content. In more detail, if the content parameters that are stored in an image forming apparatus are changed, the changed content parameters are updated in the image forming apparatus.

The content name 210 indicates functions of content provided to the image forming apparatus according to the license policy. The content provider 220 indicates providers that provide each piece of content. The license count 230 indicates the license count necessary to authenticate each piece of content. Status 240 indicates whether content is authenticated in the image forming apparatus.

For example, content having a content name "Fax to Email" has a "function of sending fax data via email", is provided by "Fax Ctx Co.", needs the license count "4" for the authentication of the content, and is "in an unauthenticated status".

FIG. 3 is a user interface illustrating a license policy 300 that uses content developed by a specific content provider according to an embodiment of the present general inventive concept. Referring to FIG. 3, the user interface 300 can indicate a content name 310, a content provider 320, status 330, and licensable provider 340.

The licensable provider 340 indicates a content provider to authenticate content in an image forming apparatus according to the license policy. Since the content provider to authenticate content 340 is "Widget Print Co." in the present embodiment, content provided by "Widget Print Co." among various pieces of content indicated in the user interface 300 satisfies the license policy.

FIG. 4 is a user interface 400 illustrating a license policy that previously determines a license count and a license rank necessary to authenticate each piece of content according to an embodiment of the present general inventive concept. Referring to FIG. 4, in the license policy that previously determines the license count and the license rank necessary to authenticate each piece of content, the user interface 400 can indicate a content name 410, a content provider 420, License Count 430, an application level 440, and status 450. The user interface 400 includes Total License Count 460, the content number used to authenticate each piece of content 470 (Used License Count 470), a license count necessary to authenticate each piece of content 480 (Remain License Count 480), and a license level 490. Although the license policy that previously determines the license count and the license rank necessary to authenticate each piece of content is used in the present embodiment, a license policy that previously determines the license rank only can be used.

The license level 490 is a value of a license level established in a cartridge, and indicates an importance according to the license policy. The established license level value can restrict important content. If the license level value is established as "2", content having an application level below "2" satisfies the license policy among various pieces of content indicated in the user interface 400. In more detail, content having an application level below the license level is determined to satisfy the license policy among the various pieces of content indicated in the user interface 400.

In the above-described embodiments the user interfaces 200, 300, and 400 illustrate the license policies that previously determine the license count necessary to authenticate each piece of content, can use content developed by the specific content provider, and previously determine the license count and the license rank necessary to authenticate each piece of content, respectively, but are not necessarily limited thereto. In more detail, when another license policy is included in the cartridge, a user interface according to the license policy is displayed.

Hereinafter, the method illustrated in FIG. 1 will now be described in detail with reference to FIGS. 2, 3, and 4. In operation 120, content that is to be executed in the image forming apparatus is selected from the various pieces of content. Although the user interfaces illustrated in FIGS. 2 to 6 can be displayed on the image forming apparatuses with regard to the method of authenticating content provided to the image forming apparatus of the present embodiment, the user interfaces can also be displayed on a host device (not illustrated) connected to the image forming apparatus via a local or a network.

For example, content having a content name "Fax to Email" can be selected from the various pieces of content indicated in the user interfaces 200, 300, and 400 illustrated in FIGS. 2 to 4, respectively. Also, content having a content name "Receive Fax to PC" can be selected from the various pieces of content indicated in the user interfaces 200, 300, and 400 illustrated in FIGS. 2 to 4, respectively. In this regard, two or more pieces of content can be selected. Furthermore, previously authorized content is canceled and another piece of content can be selected.

In operation 130, a determination is made whether the selected content satisfies the license policy. When two or more pieces of content are selected, a determination is made whether the selected pieces of content satisfy the license policy according to a temporal sequence. If the selected content satisfies the license policy, operation 140 is performed. If not, operation 150 is performed.

If the content having the content name "Fax to Email" is selected in the user interface 200 illustrated in FIG. 2, the license count that can be used to authenticate current content is "5", and the license count necessary to authenticate the selected content having the content name "Fax to Email" is "4". In more detail, since the license count necessary to authenticate the selected content is below the license count that can be used to authenticate current content, the selected content satisfies the license policy that authenticates the content according to the license count. Therefore, if the content having the content name "Fax to Email" is selected, the license policy is determined to be satisfied.

Meanwhile, if the content having the content name "Receive Fax to PC" is selected in the user interface 200 illustrated in FIG. 2, the license count that can be used to authenticate current content is "5", and the license count necessary to authenticate the selected content having the content name "Receive Fax to PC" is "6". In more detail, since the license count necessary to authenticate the selected content exceeds the license count that can be used to authenticate current content, the selected content does not satisfy the license policy that authenticates the content according to the license count. Therefore, if the content having the content name "Receive Fax to PC" is selected, the license policy is determined not to be satisfied. If authentication of content having a content name "Scan to Mobile" is canceled in the user interface 200 illustrated in FIG. 2, since the Remain License Count 200 is changed to "8", the authentication of content having the content name "Scan to Mobile" is canceled, and the content having the content name "Receive Fax to PC" is selected, so that the selected content can satisfy the license policy that authenticates content according to the license count.

Furthermore, if the content having the content name "Fax to Email" is selected in the user interface 300 illustrated in FIG. 3, since a content provider that can authenticate content according to the license policy described with regard to FIG. 3 is "Widget Print Co.", and a content provider that provides the content having the content name "Fax to Email" is "Fax Ctx Co.", the selected content does not satisfy the license policy. Therefore, if the content having the content name "Fax to Email" is selected, the license policy is determined not to be satisfied.

Meanwhile, if content having a content name "Widget News" is selected in the user interface 300 illustrated in FIG. 3, since the content provider that can authenticate content according to the license policy described with regard to FIG. 3 is "Widget Print Co.", and a content provider that provides the content having the content name "Widget News" is "Widget Print Co.", the selected content satisfies the license policy. Therefore, if the content having the content name "Widget News" is selected, the license policy is determined to be satisfied.

Furthermore, if the content having the content name "Fax to Email" is selected in the user interface 400 illustrated in FIG. 4, since a license rank necessary to authenticate the license policy described with regard to FIG. 4 is "2", and an application level of the content having the content name "Fax to Email" is "3", the selected content does not satisfy the license policy. Therefore, if the content having the content name "Fax to Email" is selected, the license policy is determined not to be satisfied.

Meanwhile, if the content having the content name "Widget News" is selected in the user interface 400 illustrated in FIG. 4, since the license rank necessary to authenticate the license policy described with regard to FIG. 4 is "2", and an application level of the content having the content name "Widget News" is "2", the selected content satisfies the license policy. Also, since the Remain License Count is "13", and the license count that can be used to authenticate the content having the content name "Widget News" is "2", the selected content satisfies the license policy. Therefore, if the content having the content name "Widget News" is selected, the license policy is determined to be satisfied.

In operation 140, the selected content is authenticated in such a manner that the authenticated content can be executed in the image forming apparatus since the selected content satisfies the license policy of the content authentication information included in the cartridge. Since the content is stored in the image forming apparatus, the stored content is authenticated using the content authentication information, so that the authenticated content can be executed in the image forming apparatus. If the content is not stored in the image forming apparatus, downloaded content is authenticated using the content authentication information included in the cartridge, so that the authenticated content can be executed in the image forming apparatus.

If the content having the content name "Fax to Email" is authenticated in operation 140 in the user interface 200 illustrated in FIG. 2, a user interface illustrated in FIG. 5 is displayed on the image forming apparatus.

In more detail, referring to FIG. 5, if the content having the content name "Fax to Email" is authenticated, a content number that has been used to authenticate content 560 (Used License Count 560), a license count that can be used to authenticate content 570 (Remain License Count 570), and a content authentication status 540 (Status 540) are changed. That is, since the license count "4" is used to authenticate the content having the content name "Fax to Email", the Used License Count 560 is changed from "15" to "19", and the Remain License Count 570 is changed from "5" to "1", and the status of "Fax to Email" is changed to "licensed". If the content is authenticated in operation 140 in the user interfaces 300 and 400 illustrated in FIGS. 3 and 4, the status of the authenticated content is changed to "licensed".

Figure 6:
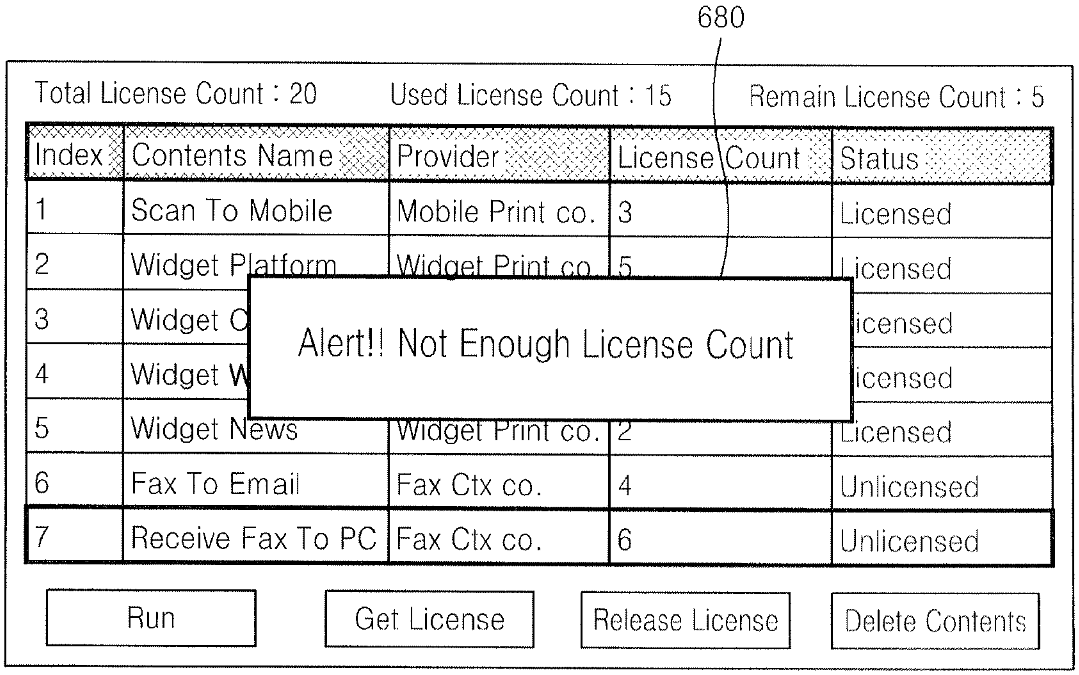
FIG. 6 is a user interface indicating when selected content does not satisfy the license policy that previously determines a license count necessary to authenticate each piece of content according to an embodiment of the present general inventive concept.

In operation 150, a message indicating a lack of the license count that can be used to authenticate the content is displayed on the image forming apparatus. Referring to FIG. 6, the message "Alert!! Not Enough License Count" 680 indicating a lack of the license count that can be used to authenticate the content is displayed on the image forming apparatus. If the cartridge including the content authentication information is out of ink, information indicating a necessity for an exchange of cartridges and authentication of information can be specifically displayed. That is, if the cartridge is empty, such information can be displayed so as to notify the user of the empty cartridge.

In operation 160, a message indicating that the cartridge does not include the content authentication information is displayed on the image forming apparatus. Therefore, the image forming apparatus can use a general function thereof.

Figure 7:
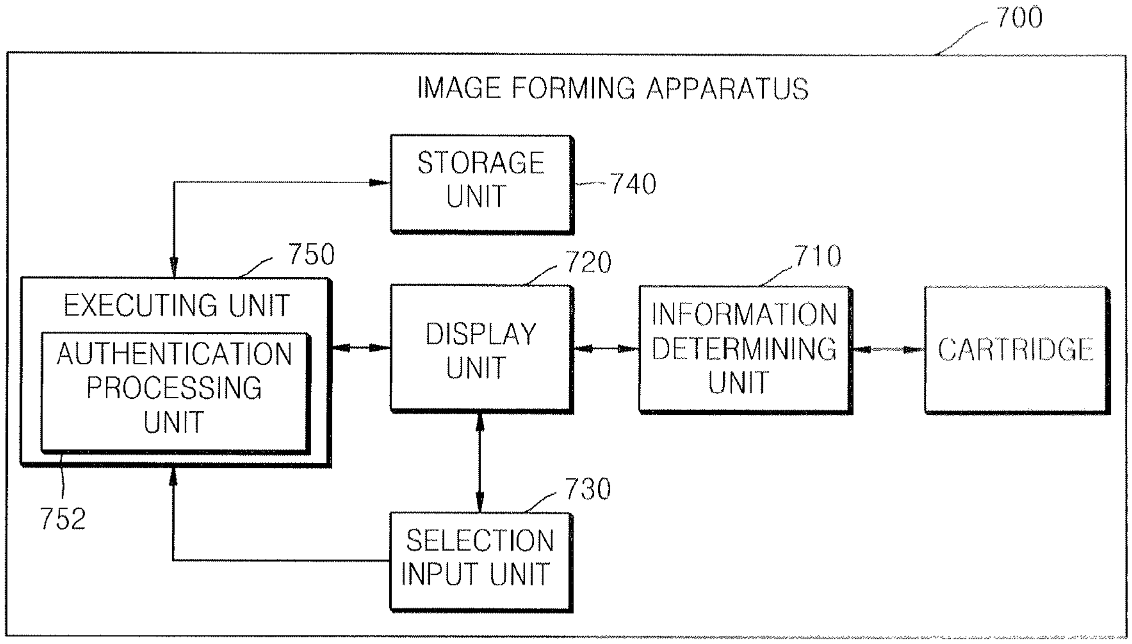
FIG. 7 is a block diagram illustrating an image forming apparatus that authenticates content available in the image forming apparatus according to an embodiment of the present general inventive concept.

FIG. 7 is a block diagram illustrating an image forming apparatus 700 that performs a method of authenticating content available in the image forming apparatus according to an embodiment of the present general inventive concept. Referring to FIG. 7, the image forming apparatus 700 includes an information determining unit 710, a display unit 720, a selection input unit 730, a storage unit 740, and an executing unit 750.

The information determining unit 710 determines whether a cartridge includes content authentication information.

According to the method of authenticating content available in the image forming apparatus of the present embodiment, a license cartridge or a general cartridge can be disposed in the image forming apparatus 700.

The license cartridge further includes the content authentication information such as a license code, a license policy, policy information, etc, in addition to basic information included in the cartridge. Thus, the information determining unit 710 confirms the cartridge disposed in the image forming apparatus and determines whether the cartridge includes the content authentication information. The information determining unit 710 can determine whether the cartridge includes the content authentication information by confirming if the cartridge includes the license code.

The display unit 720 displays a user interface indicating various pieces of content available according to a license policy used for the authentication of content if the cartridge includes the content authentication information. If a license policy that previously determines a license count necessary to authenticate each piece of content is used in the present embodiment, the display unit 720 displays the user interface 200 illustrated in FIG. 2. If the cartridge does not include the content authentication information, the display unit 720 indicates a message indicating that the cartridge does not include the content authentication information. If the cartridge including the content authentication information is out of ink, the display unit 720 specifically displays information indicating that exchanging cartridges and authenticating content is necessary. The display unit receives a signal corresponding to a determination of the information unit 710 to display the user interface.

The selection input unit 730 inputs a selection of at least one piece of content from the various pieces of content displayed on the display unit 720. In more detail, the selection of content that is to be executed in the image forming apparatus 700 can be input through the selection input unit 730 to the executing unit 750 and/or the display unit 720. A selection of a piece of content is not necessarily input but a selection of two or more pieces of content can be input. The selection can be transmitted directly to the executing unit 750 or indirectly to the executing unit 750 through the display unit 720.

The storage unit 740 stores various pieces of content available in the image forming apparatus 700.

The executing unit 750 executes the selected content input by the selection input unit. In more detail, the executing unit 750 includes an authentication processing unit 752 by which authenticated content is executed.

The authentication processing unit 752 determines whether the selected content satisfies a license policy, and, if the selected content satisfies the license policy, authenticates the selected content using the content authentication information so that the authenticated content can be executed in the image forming apparatus 700. Since the various pieces of content available in the image forming apparatus 700 are stored in the storage unit 740, the authentication processing unit 752 authenticates the various pieces of content stored in the storage unit 740 using the content authentication information. If the selected content is not stored in the storage unit 740, the authentication processing unit 752 accesses a content providing server, downloads content from the content providing server, and authenticates the downloaded content by using the content authentication information.

For example, the user interface 200 illustrated in FIG. 2 is displayed on the display unit 720 according to the license policy that previously determines the license count necessary to authenticate each piece of content. If the content having the content name "Fax to Email" is selected in the user interface 200, the license count that can be used to authenticate current content is "5", and the license count necessary to authenticate the selected content having the content name "Fax to Email" is "4". In more detail, since the license count necessary to authenticate the selected content is below the license count that can be used to authenticate current content, the selected content satisfies the license policy that authenticates the content according to the license count. Therefore, the authentication processing unit 752 authenticates the selected content using the content authentication information so that the authenticated content can be executed in the image forming apparatus 700.

For another example, the user interface 300 illustrated in FIG. 3 is displayed on the display unit 720 according to a license policy that can use content developed by a specific content provider. If the content having the content name "Widget News" is selected in the user interface 300 illustrated in FIG. 3, since the content provider that can authenticate content according to the license policy described with regard to FIG. 3 is "Widget Print Co.", and the content provider that provides the content having the content name "Widget News" is "Widget Print Co.", the selected content is determined to satisfy the license policy. Therefore, the authentication processing unit 752 authenticates the selected content by using the content authentication information so that the authenticated content can be executed in the image forming apparatus 700.

As another example, the user interface 400 illustrated in FIG. 4 is displayed on the display unit 720 according to a license policy that previously determines a license count and a license rank necessary to authenticate each piece of content. If the content having the content name "Widget News" is selected in the user interface 400 illustrated in FIG. 4, since the license rank necessary to authenticate the license policy described with regard to FIG. 4 is "2", and the application level of the content having the content name "Widget News" is "2", the selected content satisfies the requirement of the license rank. Also, since the license count that can be used to authenticate the current content is "13", and the license count that can be used to authenticate the content having the content name "Widget News" is "2", the selected content satisfies the requirement of the license count. Therefore, if the content having the content name "Widget News" is selected, the license policy is determined to be satisfied. Thus, the authentication processing unit 752 authenticates the selected content using the content authentication information so that the authenticated content can be executed in the image forming apparatus 700.

If the selected content does not satisfy the license policy, the authentication processing unit 752 transfers such information to the display unit 730. Then, the display unit 730 can display a message indicating that the selected content cannot be authenticated.

For example, the user interface 200 illustrated in FIG. 2 is displayed on the display unit 720 according to the license policy that previously determines the license count necessary to authenticate each piece of content. If the content having the content name "Receive Fax to PC" is selected in the user interface 200 illustrated in FIG. 2, the license count that can be used to authenticate current content is "5", and the license count necessary to authenticate the selected content having the content name "Receive Fax to PC" is "6". In more detail, since the license count necessary to authenticate the selected content exceeds the license count that can be used to authenticate current content, the selected content does not satisfy the license policy that authenticates the content according to the license count. Therefore, the authentication processing unit 752 transfers information indicating that the selected content does not satisfy the license policy to the display unit 730. Then, the display unit 730 displays the message indicating that the selected content cannot be authenticated.

The general inventive concept can also be embodied as computer-readable codes on a computer-readable recording medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

A method of authenticating content provided to an image forming apparatus of the present general inventive concept determines whether at least one consumable disposed in the image forming apparatus includes authentication information of at least one piece of content provided to the image forming apparatus, displays various pieces of content on a user interface according to a license policy corresponding to the authentication information, selects at least one piece of content from various pieces of content, and executes the selected content, thereby stably using the selected content in the image forming apparatus that has been authorized to use the selected content.

While the present general inventive concept has been particularly illustrated and described with reference to various exemplary embodiments thereof, it will be understood by those of ordinary skill in the art that various changes in form and details may be made therein without departing from the spirit and scope of the present general inventive concept as defined by the following claims.

What is claimed is:

1. A method of authenticating at least one piece of content provided to an image forming apparatus in which at least one consumable is disposed, the method comprising:

determining whether the at least one consumable includes authentication information of the at least one piece of content;

displaying the at least one piece of content on a user interface according to a license policy corresponding to the authentication information;

selecting at least one piece of content from the at least one piece of content displayed on the user interface;

determining whether the selected content satisfies the license policy based on at least one of an application level of the selected content and a content provider of the selected content;

if the selected content satisfies the license policy, authenticating the selected content so that the authenticated content can be executed in the image forming apparatus; and executing the authenticated content, wherein, when the license policy allows content developed by a specific content provider to be used, the authenticating of the selected content includes authenticating the selected content if the content provider of the selected content is the specific content provider established according to the license policy.

2. The method of claim 1, further comprising:

if the at least one consumable does not include the authentication information, displaying a message indicating that the at least one consumable does not include the authentication information.

3. The method of claim 1, further comprising:

if the authenticated content is executed in the image forming apparatus, changing parameters of the executed content according to the license policy.

4. The method of claim 3, further comprising:

storing the changed parameters of the executed content in the image forming apparatus.

5. The method of claim 1, wherein, if the license policy previously determines a license count necessary to authenticate each piece of content, the authenticating of the selected content comprises:

if the license count of the selected content is below a license count that can be used to authenticate content, authenticating the selected content.

6. The method of claim 1, wherein, if the license policy previously determines a license count and a license rank necessary to authenticate each piece of content, the authenticating of the selected content comprises:

if the license count of the selected content is below the license count that can be used for an authentication of content, and an application level of the selected content is below a license level established according to the license policy, authenticating the selected content.

7. The method of claim 1, further comprising:

if the at least one consumable is out of ink or experiences an error, displaying information regarding an exchange of the at least one consumable and the authentication information on the user interface.

8. The method of claim 1, further comprising:

displaying details regarding the at least one piece of content.

9. The method of claim 1, wherein the user interface is displayed on the image forming apparatus or a host device connected to the image forming apparatus via a local or a network.

10. An apparatus to authenticate at least one piece of content provided to an image forming apparatus in which at least one consumable is disposed, the apparatus comprising:

an information determining unit to determine whether the at least one consumable includes authentication information of the at least one piece of content;

a display unit to display the at least one piece of content on a user interface according to a license policy corresponding to the authentication information;

a selection input unit to select at least one piece of content from the at least one piece of content displayed on the user interface;

an authentication processing unit to determine whether the selected content satisfies the license policy based on at least one of an application level of the selected content and a content provider of the selected content and if the selected content satisfies the license policy, to authenticate the selected content so that the authenticated content can be executed in the image forming apparatus; and an executing unit to execute the authenticated content, wherein, when the license policy allows content developed by a specific content provider to be used, the authentication processing unit authenticates the selected content if the content provider of the selected content is the specific content provider established according to the license policy.

11. The apparatus of claim 10, wherein the display unit, if the at least one consumable does not include the authentication information, displays a message indicating that the at least one consumable does not include the authentication information.

12. The apparatus of claim 10, wherein the executing unit, if the authenticated content is executed in the image forming apparatus, changes parameters of the executed content according to the license policy.

13. The apparatus of claim 12, further comprising:

a storage unit to store the changed parameters of the executed content.

14. The apparatus of claim 10, wherein, if the license policy previously determines a license count necessary to authenticate each piece of content, the authentication processing unit, if the license count of the selected content is below a license count that can be used to authenticate content, authenticates the selected content.

15. The apparatus of claim 10, wherein, if the license policy previously determines a license count and a license rank necessary to authenticate each piece of content, the authentication processing unit, if the license count of the selected content is below the license count that can be used for an authentication of content, and an application level of the selected content is below a license level established according to the license policy, authenticates the selected content.

16. The apparatus of claim 10, wherein the display unit, if the at least one consumable is out of ink or experiences an error, displays information regarding an exchange of the at least one consumable and the authentication information on the user interface.

17. A consumable, comprising:

a storage unit to store authentication information including license policy information, wherein the authentication information is used to determine whether at least one piece of content satisfies the license policy based on at least one of an application level of the at least one piece of content and a content provider of the at least one piece of content and to authenticate the at least one piece of content satisfying the license policy, wherein, when the license policy allows content developed by a specific content provider to be used, the at least one piece of content is authenticated if the content provider of the at least one piece of content is the specific content provider established according to the license policy.

18. An authentication apparatus, comprising:

a display unit to display content having authentication information according to a license policy corresponding to the authentication information;

a selection input unit to select the displayed content; and an executing unit including an authentication processing unit to determine whether the selected content satisfies the license policy based on at least one of an application level of the selected content and a content provider of the selected content, to authenticate the selected content satisfying the license policy, and to execute the selected content and to change one or more parameters of the executed content according to the license policy, wherein, when the license policy allows content developed by a specific content provider to be used, the authentication processing unit authenticates the selected content if the content provider of the selected content is the specific content provider established according to the license policy.

19. An authentication method, comprising:

displaying, on a user interface, content having authentication information according to a license policy corresponding to the authentication information;

selecting the displayed content;

determining whether the selected content satisfies the license policy based on at least one of an application level of the selected content and a content provider of the selected content;

authenticating the selected content satisfying the license policy;

executing the selected content; and changing one or more parameters of the executed content according to the license policy, wherein, when the license policy allows content developed by a specific content provider to be used, the authenticating of the selected content includes authenticating the selected content if the content provider of the selected content is the specific content provider established according to the license policy.

* * * * *